US 8,458,613 B2

(12) United States Patent
Oshiro et al.

(10) Patent No.: US 8,458,613 B2
(45) Date of Patent: Jun. 4, 2013

(54) DYNAMIC USER INTERFACE FOR PREVIEWING LIVE CONTENT

(75) Inventors: Marc Oshiro, Seattle, WA (US); Kort Sands, Seattle, WA (US); Jeffrey N. Margolis, Seattle, WA (US); John Elsbree, Bellevue, WA (US); Jeffrey C. Fong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 36 days.

(21) Appl. No.: 13/251,692

(22) Filed: Oct. 3, 2011

(65) Prior Publication Data

US 2012/0023442 A1    Jan. 26, 2012

Related U.S. Application Data

(63) Continuation of application No. 11/821,604, filed on Jun. 25, 2007, now Pat. No. 8,065,628.

(51) Int. Cl.
*G06F 3/048* (2006.01)
*G06F 3/14* (2006.01)

(52) U.S. Cl.
USPC ............ 715/788; 715/716; 715/810; 725/37; 725/44

(58) Field of Classification Search
USPC ................ 715/716, 719, 764, 765, 781, 788, 715/792, 810, 821, 205, 243, 249; 725/37, 725/39, 41, 44, 59, 104
See application file for complete search history.

(56) References Cited

U.S. PATENT DOCUMENTS

| | | | |
|---|---|---|---|
| 5,524,195 | A | 6/1996 | Clanton, III et al. |
| 6,188,405 | B1 | 2/2001 | Czerwinski et al. |
| 6,466,237 | B1 | 10/2002 | Miyao et al. |
| 6,522,342 | B1 | 2/2003 | Gagnon et al. |
| 6,611,291 | B1 | 8/2003 | Dow et al. |
| 6,721,952 | B1 | 4/2004 | Guedalia et al. |
| 7,051,291 | B2 | 5/2006 | Sciammarella et al. |
| 7,669,141 | B1 | 2/2010 | Pegg |
| 8,065,628 | B2 | 11/2011 | Oshiro |
| 2002/0067376 | A1 | 6/2002 | Martin et al. |
| 2003/0063125 | A1 | 4/2003 | Miyajima et al. |
| 2005/0091599 | A1 | 4/2005 | Yamakado et al. |
| 2006/0150091 | A1* | 7/2006 | Suzuki et al. ................ 715/517 |
| 2006/0156227 | A1 | 7/2006 | Hosotsubo |
| 2006/0156240 | A1 | 7/2006 | Lemay et al. |
| 2006/0200751 | A1 | 9/2006 | Underwood et al. |

(Continued)

OTHER PUBLICATIONS

"Final Office Action", U.S. Appl. No. 11/821,604, (Mar. 21, 2011),9 pages.

(Continued)

*Primary Examiner* — Xiomar L Bautista
(74) *Attorney, Agent, or Firm* — Wolfe-SBMC

(57) ABSTRACT

A dynamic user interface for previewing live content includes multiple tiles. Information for multiple pieces of live content available from a gallery is obtained, and this information is presented in the multiple tiles of the user interface in accordance with a current user interface layout. In accordance with one aspect, this current user interface layout changes automatically over time as the user interface is displayed. In accordance with another aspect, one or more of the multiple tiles is displayed in the user interface more prominently than the other tiles, and which information is to be displayed in the one or more tiles is based at least in part on a received fee.

20 Claims, 7 Drawing Sheets

U.S. PATENT DOCUMENTS

| | | | |
|---|---|---|---|
| 2006/0224993 A1 | 10/2006 | Wong et al. | |
| 2006/0236251 A1 | 10/2006 | Kataoka et al. | |
| 2006/0242567 A1 | 10/2006 | Rowson et al. | |
| 2006/0293771 A1 | 12/2006 | Tazine et al. | |
| 2007/0055986 A1 | 3/2007 | Gilley et al. | |
| 2007/0082707 A1 | 4/2007 | Flynt et al. | |
| 2008/0086688 A1 | 4/2008 | Chandratillake et al. | |
| 2008/0100696 A1 | 5/2008 | Schirdewahn | |
| 2008/0109557 A1 | 5/2008 | Joshi et al. | |
| 2008/0155458 A1 | 6/2008 | Fagans et al. | |
| 2008/0307307 A1 | 12/2008 | Ciudad et al. | |
| 2008/0320413 A1 | 12/2008 | Oshiro | |
| 2009/0119578 A1 | 5/2009 | Relyea et al. | |
| 2010/0007774 A1* | 1/2010 | Imamura | 348/239 |

OTHER PUBLICATIONS

"Non-Final Office Action", U.S. Appl. No. 11/821,604, (Nov. 26, 2010),11 pages.

"Non-Final Office Action", U.S. Appl. No. 11/821,604, (Jul. 23, 2010),5 pages.

"Notice of Allowance", U.S. Appl. No. 11/821,604, (Jul. 12, 2011),4 pages.

"Display Multiple Images Together", retrieved from <http://www.lunaimaging.com/v4_0help/insight/idh_display_multiple_images_together.htm> on Apr. 16, 2007, 3 pages.

Graeber, Ross et al., "ZooMICSS: A Zoomable Map Image Collection Sensemaking System (The Katrina Rita Context)", *MM '06*, Oct. 23-27, 2006, Santa Barbara, CA, pp. 795-796.

Kang, Hyunmo et al., "Visualization Methods for Personal Photo Collections: Browsing and Searchng in the PhotoFinder", *Multimedia and Expo, 2000. ICME 2000. 2000 IEEE International Conference*, Jul. 30-Aug. 2, 2000, New York, NY, available at <http://www.cs.umd.edu/hcil/photolib/paper/ICME2000-final.doc>, (Jul. 30, 2000), 4 pages.

* cited by examiner

DYNAMIC USER INTERFACE FOR PREVIEWING LIVE CONTENT

RELATED APPLICATION

This application is a continuation of and claims priority to U.S. patent application Ser. No. 11/821,604 filed Jun. 25, 2007 entitled "Dynamic User Interface for Previewing Live Content" to Oshiro et al., the disclosure of which is incorporated by reference herein in its entirety.

BACKGROUND

As computers have become increasingly powerful and increasingly inter-connected, the amount of content available to users has also grown. This available content spans a wide range of types of content, including music, videos, movies, pictures, text, and so forth. However, one problem users face in viewing this content is knowing what content is available. Users can navigate to various locations, such as over the Internet, to find content but such navigation can be time consuming for the user and the manner in which such content is displayed to the user can be very user-unfriendly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A dynamic user interface for previewing live content is described herein. In accordance with one or more aspects, information for multiple pieces of live content available from a gallery is obtained. This information is presented in multiple tiles of a user interface in accordance with a current user interface layout. Additionally, this current user interface layout changes automatically over time as the user interface is displayed.

In accordance with one or more aspects, information for multiple pieces of live content available from a gallery is identified. This information is presented in multiple tiles of a current user interface in accordance with a current user interface layout. The multiple tiles have different sizes, and one or more of the multiple tiles is displayed in the user interface more prominently than the other tiles. Which information is to be displayed in the one or more tiles being based at least in part on a received fee.

BRIEF DESCRIPTION OF THE DRAWINGS

The same numbers are used throughout the drawings to reference like features.

DETAILED DESCRIPTION

A dynamic user interface for previewing live content is discussed herein. The content that is currently available from a content source is referred to as live content. Information regarding the live content is retrieved and a user interface is generated that presents a preview of the live content to a user. The user interface includes multiple tiles that each correspond to a piece of the live content. These multiple tiles can have different sizes, shapes, and/or orientations. Additionally, the locations in which the tiles are displayed, as well as the size, shape, and/or orientation of the tiles, can be changed over time to create a moving, changing user interface.

Figure 1:
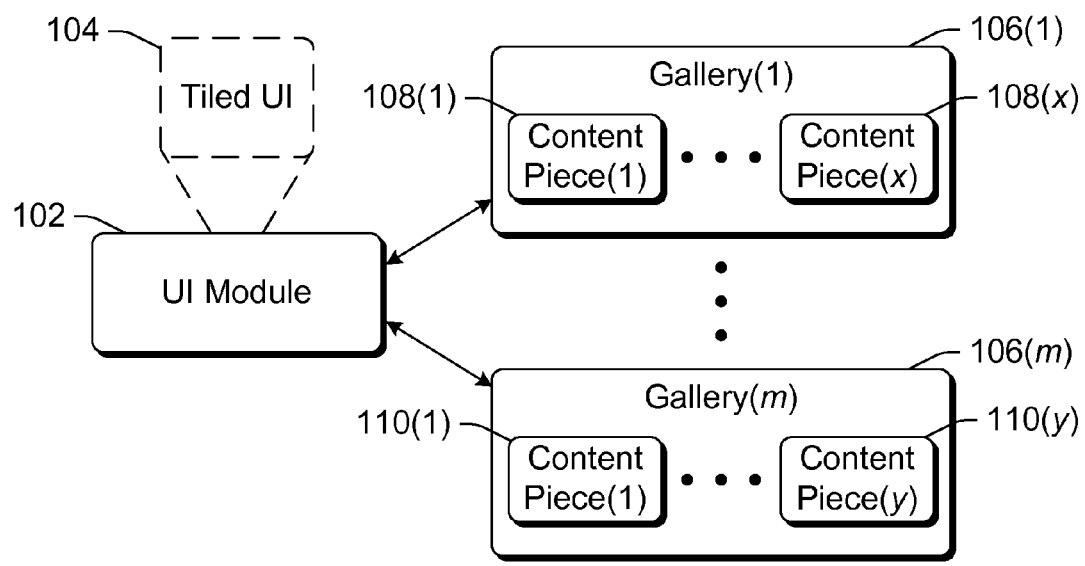
FIG. 1 illustrates an example system using the dynamic user interface for previewing live content discussed herein.

FIG. 1 illustrates an example system 100 using the dynamic user interface for previewing live content discussed herein. System 100 includes a user interface (UI) module 102 that generates a tiled user interface 104. User interface module 102 can be implemented as part of another component or module, such as part of a web browser, part of a file system, part of a search engine, and so forth. Alternatively, module 102 can be implemented as a standalone component or module.

The information displayed in user interface 104 is a preview of the live content that is available from one of multiple (m) galleries 106(1), . . . , 106(m). Each gallery 106, also referred to as a content source, includes multiple pieces of content. As illustrated, gallery 106(1) includes multiple (x) content pieces 108(1), . . . , 108(x), and gallery 106(m) includes multiple (y) content pieces 110(1), . . . , 110(y). The quantity of content pieces included in different galleries 106 can vary.

Content pieces 108 and 110 can be any of a variety of different types of content. The types of content 108 and 110 that can be used in system 100 include any type of content that can be used by a computing device, such as video content, image content, audio content, text content, and so forth. Additionally, a particular piece of content may include two or more different types of content (e.g., video content and audio content). Different galleries 106 can include different types of content. Additionally, the content pieces included in a particular gallery 106 may all be the same type of content, or alternatively different types of content may be included in the same gallery 106.

A piece of content refers to data that can be presented to the user. How a piece of content is defined can vary based on the type of content as well as the desires of the creator of the piece of content and/or the creator or administrator of the content source. For example, a piece of content may be an entire song, multiple songs, a portion(s) of a song, an entire image, a portion(s) of an image, an entire movie, a portion(s) of a movie, and so forth. Creators of different pieces of content, and/or the creator or administrator of the content source, can create the pieces of content to be whatever they desire.

Each gallery is a source of content, and the content included in a gallery can be any of a variety of different types of data. For example, a gallery can include pieces of content representing files and/or folders that are available on a particular storage device or a particular folder of a storage device. By way of another example, a gallery can include pieces of content representing files, folders, and applications that are available on a desktop of a computing device. By way of yet another example, a gallery can include pieces of content representing files and/or folders that are available on a remote device or from a remote service. By way of still another example, a gallery can include pieces of content representing web pages or other objects that are a result of a previously entered search request.

User interface module 102 obtains information for pieces of content 108 or 110 from a gallery 106 and generates tiled user interface 104 to be a preview of the pieces of content available from that gallery 106. In user interface 104, each tile displays information for a different piece of content. What information is obtained for a piece of content, and how that information is displayed in a tile, can vary by implementation and can vary based on content type (or can vary for different pieces of content of the same type). In one or more embodiments, the information is an image from the piece of content itself. This image can be the actual piece of content (e.g., if the piece of content itself is an image), or an image extracted from the actual piece of content (e.g., a single image from a video or movie, a portion of an image, etc.). In one or more other embodiments, the information displayed in the tile is associated with the piece of content but need not be the actual piece of content (or a portion thereof). For example, the creator of the piece of content can create a preview image that is associated with the piece of content and this preview image is the information displayed in the tile. Such a preview image could be stored with the piece of content as meta data, stored on the same content source as the piece of content, obtained from some other content source, and so forth.

In one or more other embodiments, other types of information can be displayed in a tile rather than an image. For example, a text description of the piece of content can be displayed in the tile. Such a text description could be created, for example, by the creator of the piece of content and associated with the piece of content (e.g., as meta data, stored on the same content source as the piece of content, stored on some other content source, and so forth). By way of another example, one or more tiles may include audio content that is played back audibly to the user. Accordingly, it should be noted that although the user interface is often referred to herein as being displayed, the user interface may also be presented in other manners (e.g., audibly). By way of another example, the information displayed in a tile can change over time rather than being static. This changing information can be animation content, a slideshow of images, video content, and so forth.

It should also be noted that multiple types of information can be displayed in a tile. For example, a tile could include both image data and a text description. By way of another example, a tile could include both a slideshow of images and audio content.

User interface module 102 can be programmed with the particular manner in which information for pieces of contents are to be displayed in tiles. For example, module 102 may be programmed to use the piece of content itself for image content, select a first image from a series of images for video content, access a particular meta data field to obtain the image (or other information) to be displayed, and so forth.

User interface 104 typically displays a preview of content from a single gallery 106 at a time, although alternatively user interface 104 could display a preview of content from multiple galleries 106 concurrently. User interface module 102 can obtain information for all of the pieces of content 108 or 110 from the gallery 106 for which it is generating the tiled user interface, or alternatively can obtain information for only some of the pieces of content 108 or 110. If information for only some of the pieces of content is being obtained, which pieces are having their information obtained can be determined in different manners. For example, the pieces of content may have associated rankings and information for only the highest ranked content may be obtained, information for the most commonly accessed pieces of content may be obtained, information for whatever pieces of content have been flagged as being most important by an administrator of the gallery may be obtained, the pieces of content for which information is to be obtained may be selected randomly, and so forth.

Information for all of the pieces of content that are obtained from the gallery can be displayed as part of the tiled user interface 104, or alternatively only some of the obtained information may be displayed. Similar to determining which information is to be obtained, if only some of the obtained information is displayed then which information is displayed can be determined in different manners. For example, the pieces of content may have associated rankings and the information for highest ranked content may be displayed, information for the most commonly accessed pieces of content may be displayed, information for whatever pieces of content have been flagged as being most important by an administrator of the gallery or by the designer of module 102 may be displayed, the pieces of content for which information is to be displayed may be selected randomly, and so forth.

User interface 104 is a tiled user interface, which refers to the user interface being separated into multiple tiles or portions. These different tiles can have different sizes (e.g., different dimensions, different areas, etc.) and/or different shapes. Additionally, tiles can be rotated to different orientations so that a piece of content displayed in the tile appears to be at an angle (or upside down), rather than being horizontal or vertical. User interface 104 is referred to as being dynamic because the tiles can have different sizes, shapes, and/or orientations, as well as because these sizes, shapes, and/or orientations can change as discussed in more detail below.

Figure 2:
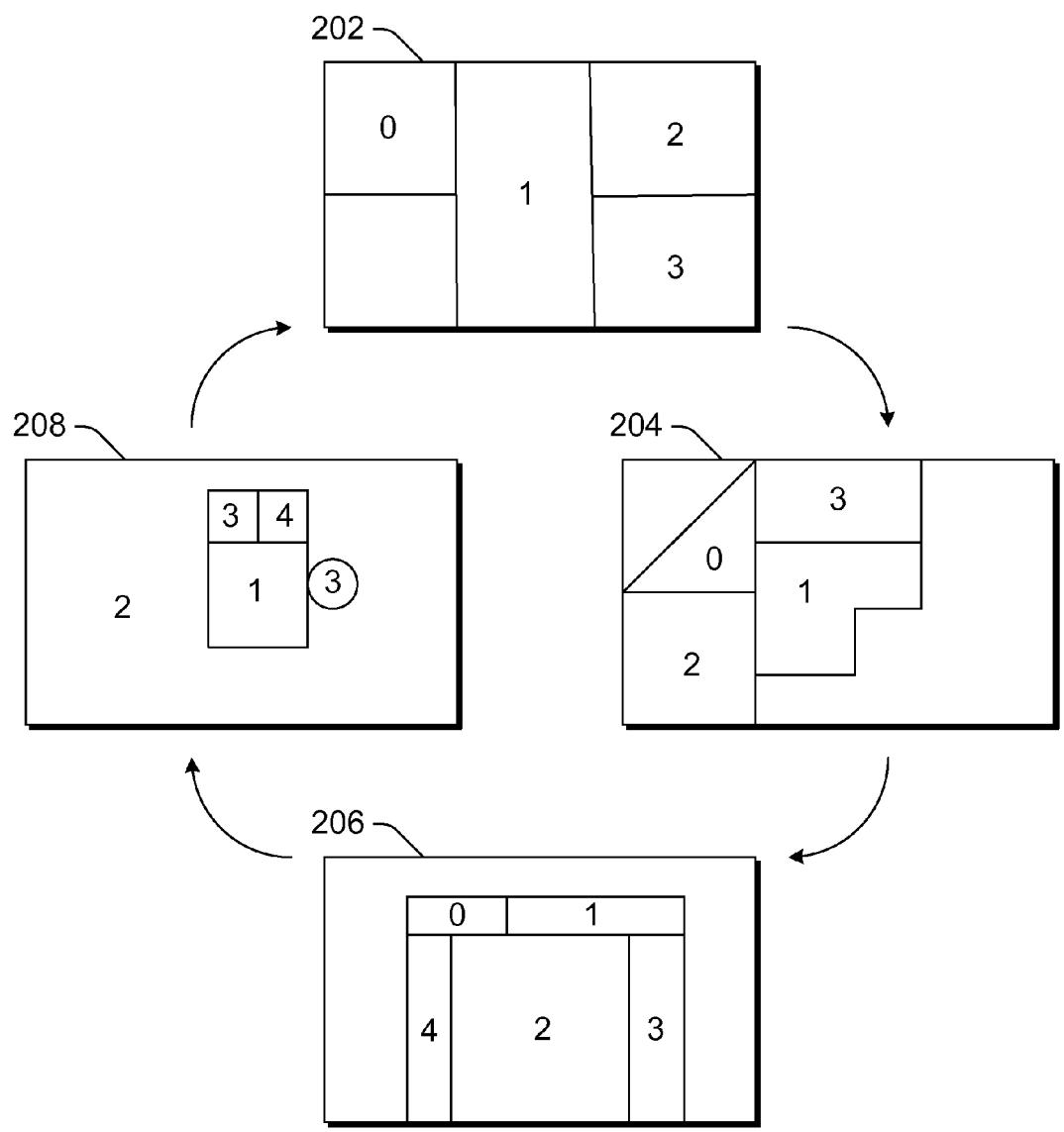
FIG. 2 illustrates an example series of tiled user interfaces.

FIG. 2 illustrates an example series 200 of tiled user interfaces. Four different user interfaces 202, 204, 206, and 208 are illustrated in FIG. 2. Each of these user interfaces 202, 204, 206, and 208 is an example of a tiled user interface 104 of FIG. 1. Additionally, each of these user interfaces 202, 204, 206, and 208 is organized differently, such as different locations for tiles, different sizes for tiles, different shapes for tiles, different information displayed in tiles, and so forth. User interface module 102 can transition through these different user interfaces 202, 204, 206, and 208, resulting in different user interface displays for the same gallery, as discussed in more detail below.

In series 200, each of the user interfaces 202, 204, 206, and 208 displays information for pieces of content within tiles. These tiles are labeled as tiles 0, 1, 2, 3, and 4 (although some of these tiles are not included in some of the user interfaces 202, 204, 206, and 208). In series 200, tiles having the same label display information for the same piece of content. Typically this is the same information, although it may alternatively be different (e.g., different information for the same piece of content may be displayed in different tiles). Thus, both tiles 3 in user interface 208 display information for the same piece of content, and each tile 1 in user interface 202, 204, 206, and 208 displays information for the same piece of content. It should be noted, however, that even though two tiles display information for the same piece of content, the manner in which that information is displayed can be different due to the tiles being different sizes, shapes, and/or orientations.

User interface 202 illustrates four tiles labeled as 0, 1, 2, and 3. Information for a first piece of content is displayed in tile 0, information for a second piece of content is displayed in tile 1, information for a third piece of content is displayed in tile 2, and information for a fourth piece of content is displayed in tile 3. User interface 204 also illustrates four tiles labeled as 0, 1, 2, and 3, although the tiles in user interface 204 are organized in a different pattern, and have different shapes and/or sizes, than those in user interface 202. As in user interface 202, in user interface 204 the information for the first piece of content is displayed in tile 0, the information for the second piece of content is displayed in tile 1, the information for the third piece of content is displayed in tile 2, and the information for the fourth piece of content is displayed in tile 3.

User interface 206 illustrates five tiles labeled as 0, 1, 2, 3, and 4, organized in a different pattern and having different shapes and/or sizes than those in user interfaces 202 and 204. The information for the first piece of content is displayed in tile 0, the information for the second piece of content is displayed in tile 1, the information for the third piece of content is displayed in tile 2, the information for the fourth piece of content is displayed in tile 3, and information for a fifth piece of content is displayed in tile 4. User interface 208 illustrates five tiles labeled as 1, 2, 3, 3, and 4, organized in a different pattern and having different shapes and/or sizes than those in user interfaces 202, 204, and 206. The information for the second piece of content is displayed in tile 1, the information for the third piece of content is displayed in tile 2, the information for the fourth piece of content is displayed in both tiles 3, and the information for the fifth piece of content is displayed in tile 4.

In many instances, the various tiles in a user interface are grouped together in a cluster. For example, tiles 1, 3, 3, and 4 in user interface 208 are grouped together in a cluster, as are tiles 0, 1, 2, 3, and 4 in user interface 206. This grouping in a cluster refers to the tiles being situated close to (e.g., adjacent) the other tiles (or many of the other tiles) in the user interface.

Returning to FIG. 1, information for a piece of content is displayed in the tiles of user interface 104. The information for pieces of content displayed in user interface 104 represents the current content available from the gallery (e.g., the pieces of content available at the time the information was obtained from the gallery by user interface module 102). Thus, user interface 104 presents a preview of the live content available from the gallery. This live content refers to the pieces of content that are actually available from the gallery rather than some pre-determined fixed image. The live content changes as the pieces of content that are available from the gallery changes.

Typically, the content pieces available from a gallery change over time. Accordingly, the information for the live content that is obtained from the gallery and used for the tiles of the user interface can change over time. Each time user interface module 102 obtains the information from a gallery, it receives the information for the content pieces currently available from the gallery and thus has the information for the most recent content available from that gallery.

It should be noted that it is possible that the content pieces available from a gallery may change after the information has been obtained by module 102 and while the user interface 104 is displaying a preview of that gallery. Such situations can be resolved in different manners. In one or more embodiments, such situations are resolved by not obtaining these newest changes; rather, the live content is deemed as being the content pieces available at the time the gallery is accessed by module 102.

In other embodiments, module 102 may obtain these newest changes and alter user interface 104 to reflect these newest changes to the content. Module 102 can obtain the changes in different manners. For example, module 102 may repeatedly access the gallery (e.g., every second, every five seconds, etc.) and request the information for the current pieces of content available from the gallery, or request any changes to the information for the pieces of content that have been made since module 102 last accessed the gallery. By way of another example, module 102 may register with the gallery to receive changes to the information for the pieces of content in the gallery, and when a change to the content occurs then the gallery sends a notification to module 102 that a change has been made and what that change is.

Additionally, it should be noted that situations can arise where the information to be displayed in a tile is of a different shape or size than the tile in which it is to be displayed. For different sizes, the information can be scaled up or down as appropriate to fit the size of the tile. For different shapes, module 102 can clip or otherwise modify the information to fit into the tile. Module 102 can be programmed with various criteria to use to perform this modification, or alternatively the information itself may include criteria to be used to perform this modification. For example, a tile may be circular but the image may be rectangular. In such situations, module 102 can use a circular portion of the rectangular image to display in the tile.

It should also be noted that, in situations where information other than the actual piece of content is presented in the tiles (e.g., text, audio, a preview image associated with the piece of content, etc.), user interface module 102 need not obtain the actual pieces of content from the gallery in order to generate user interface 104 as a preview of the gallery. Rather, user interface module 102 could obtain the information being presented in the tiles and not obtain the remainder of the pieces of content. For example, if the information presented in user interface 104 as the piece of content is a single image from video content, then only that single image need be obtained by user interface module 102; user interface 104 can be generated without obtaining the remainder of the video content.

User interface module 102 can be implemented in software, firmware, hardware, or combinations thereof. In one or more embodiments, module 102 is implemented as a series of software instructions that are executed by one or more processor(s) of a computing device in order to implement the techniques discussed herein. This series of software instructions may itself include all of the instructions to implement these techniques, or alternatively may receive input from other sources (e.g., in the form of a markup language file, such as an eXtensible Markup Language (XML) file) that includes instructions describing how to implement at least some of these techniques.

Figure 3:
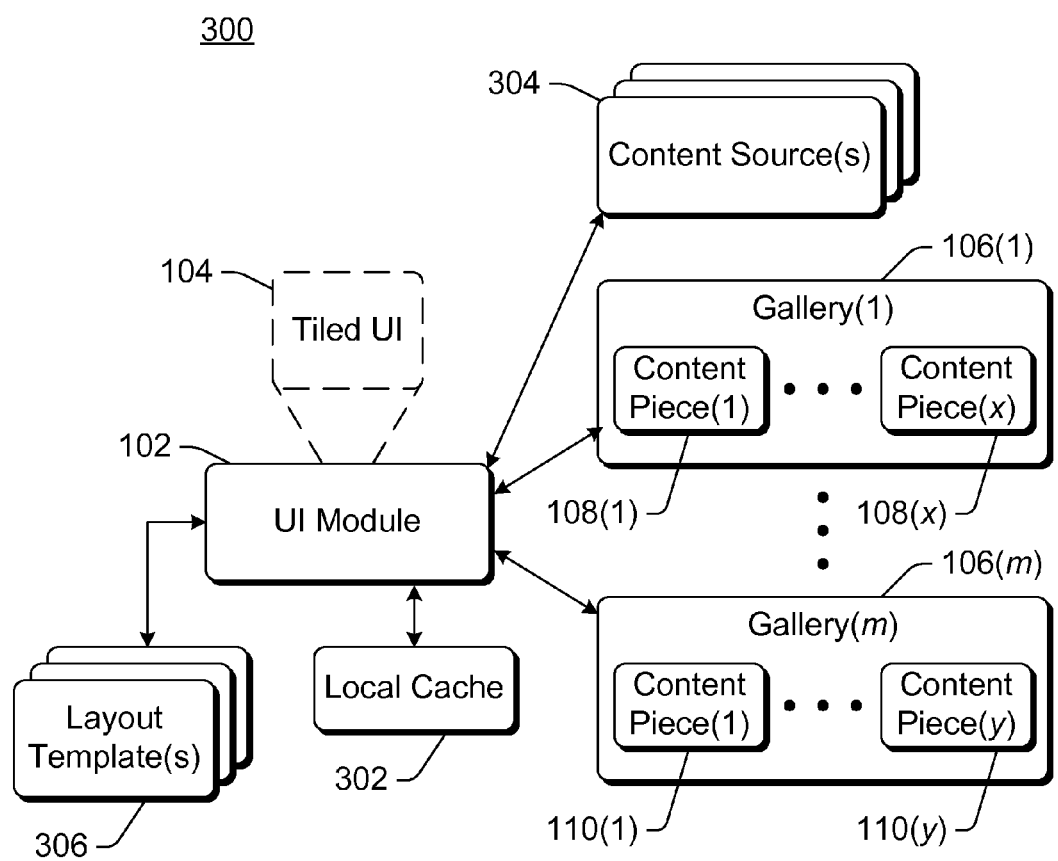
FIG. 3 illustrates another example system using the dynamic user interface for previewing live content discussed herein.

FIG. 3 illustrates an example system 300 using the dynamic user interface for previewing live content discussed herein. System 300 is similar to system 100 of FIG. 1, and includes a user interface (UI) module 102 that generates a tiled user interface 104. The information displayed in user interface 104 is a preview of the live content that is available from one of multiple (m) galleries 106(1), . . . , 106(*m*). As illustrated, gallery 106(1) includes multiple (x) content pieces 108(1), . . . , 108(*x*), and gallery 106(*m*) includes multiple (y) content pieces 110(1), . . . , 110(*y*).

Additionally, system 300 includes a local cache 302. Local cache 302 is a local storage of information for content pieces 108 and/or 110 (and/or for content pieces 108 and/or 110 themselves) that typically provides faster access to data for user interface module 102 than galleries 106 provide. Cache 302 can be implemented on the same device as implements user interface module 102, or alternatively on a different device.

When information for pieces of content for a gallery 106 is obtained, the information is stored in local cache 302. When user interface module 102 subsequently displays tiled user interface 104 previewing the pieces of content in that gallery, the information displayed in the tiles is obtained from local cache 302 rather than from gallery 106. In one or more embodiments, gallery 106 is still accessed to determine whether there are any changes to the pieces of content included in the gallery since the information for the pieces of content was stored in local cache 302. The information for the pieces of content stored in local cache 302 is modified to reflect any such changes (e.g., information for pieces of content are removed, information for new pieces of content is added, and so forth). Thus, by using local cache 302, the time required to display user interface 104 can be decreased in some situations because at least some of the information for the pieces of content can be obtained from local cache 302 rather than from gallery 106.

System 300 also includes one or more content sources 304 in addition to galleries 106. In certain embodiments, identifiers of the pieces of content that are included in a gallery 106 are stored in the gallery 106, but the actual pieces of content are not stored in the gallery 106. In such embodiments, the identifiers of the pieces of content in the gallery 106 identify one or more content sources 304 from which the pieces of content can be obtained.

System 300 further includes one or more layout templates 306. A layout template identifies the layout of tiles for a particular user interface 104. The tiles displayed for each user interface 104 can have different parameters, such as different sizes, different shapes, different locations, different orientations, and so forth. The different parameters for each tile for a particular user interface 104 are stored as a layout template 306. User interface module 102 accesses these layout templates 306 and, at any given time, displays the user interface 104 as defined by the layout template 306 currently being used. User interface module 102 can be notified of which layout template 306 to use, or alternatively module 102 can itself select which layout template 306 to use (e.g., such as randomly, in accordance with some criteria programmed into module 102, and so forth).

Different layout templates 306 can be identified by different users or other components. For example, the creator of user interface module 102 can define one or more layout templates 306. By way of another example, any user of system 300 can define one or more layout templates 306. By way of yet another example, each gallery can define one or more layout templates 306, and these templates can optionally be transmitted to module 102 (and optionally can be stored in local cache 302). By way of still another example, another user interface (such as a gallery selection interface that allows the user to select a particular gallery, as discussed in more detail below) can define one or more layout templates 306.

Returning to FIG. 2, the user interface 104 displayed for a particular gallery can have different layouts. These different layouts can be identified, for example, by layout templates 306 of FIG. 3. Alternatively, these different layouts can be identified in other manners, such as by being pre-programmed into user interface module 102.

Series 200 illustrates the transition from one layout to another for a particular user interface. As illustrated in FIG. 2, series 200 begins with one layout, such as the layout of user interface 202 (series 200 can begin with any layout). User interface 202 is displayed for an amount of time, and then user interface 204 is displayed, after which user interface 206 is displayed, and after which user interface 208 is displayed. The series then begins again, displaying user interface 202 again. In one or more embodiments, each user interface 202, 204, 206, and 208 is displayed for a particular duration of time, and then the next user interface in the series is automatically displayed. This duration of time can be the same for each user interface 202, 204, 206, and 208, or alternatively may be different for different ones of user interfaces 202, 204, 206, and 208.

The different user interfaces in series 200 are typically displayed to the user in the same area (e.g., in the same window or portion of a display device). Thus, by transitioning to different user interfaces having different layouts, the location of the information for pieces of content being displayed to the user, as well as the actual information being displayed, changes; thus, the preview of the live content in the user interface is dynamic.

In one or more embodiments, each layout can associate various parameters with each tile that define the behavior of the tile when the user interface based on that layout is initially displayed, allowing the tiles of the user interface to appear on the interface in a smooth manner. Similarly, each layout can associate various parameters with each tile that define the behavior of the tile when the user interface is disappearing from the interface (e.g., due to a transition to the next user interface in the series). Additionally, each layout can associate various parameters with each tile that define the behavior of the tile while the user interface is being displayed. Table I illustrates some example parameters that can be used to define the behavior of tiles. It is to be appreciated that the parameters in Table I are only examples; some tiles may not include these parameters, and alternatively other parameters may be used.

TABLE I

| Parameter | Description |
| --- | --- |
| Move | Describes movement of a tile from one location to another. Parameters include the beginning location, the ending location, and an amount of time the movement from the beginning to the ending location is to take. |
| Size | Describes a change in size of a tile. Parameters include a beginning size, an ending size, and an amount of time the change from the beginning size to the ending size is to take. |
| Show | Describes a fading into view of a tile. Parameters include beginning display characteristics (e.g., color, intensity, etc.), ending display characteristics, and an amount of time the change from the beginning display characteristics to the ending display characteristics is to take. |
| Hide | Describes a fading out of view of a tile. Parameters include beginning display characteristics (e.g., color, intensity, etc.), ending display characteristics, and an amount of time the change from the beginning display characteristics to the ending display characteristics is to take. |
| Alpha | Describes a change in opacity of the tile. Parameters include a beginning opacity value, an ending opacity value, and an amount of time the change from the beginning opacity value to the ending opacity value is to take. |

User interface 202 illustrates four tiles labeled as 0, 1, 2, and 3. Information for a first piece of content is displayed in tile 0, information for a second piece of content is displayed in tile 1, information for a third piece of content is displayed in tile 2, and information for a fourth piece of content is displayed in tile 3. A portion of the user interface in the lower-left corner has no content displayed.

User interface 204 also illustrates four tiles labeled as 0, 1, 2, and 3, organized in a different pattern and having different shapes and/or sizes than those in user interface 202. As in user interface 202, in user interface 204 the information for the first piece of content is displayed in tile 0, the information for the second piece of content is displayed in tile 1, the information for the third piece of content is displayed in tile 2, and the information for the fourth piece of content is displayed in tile 3. A portion of the user interface in the upper-left corner as well as the right-hand side has no content displayed.

User interface 206 illustrates five tiles labeled as 0, 1, 2, 3, and 4, organized in a different pattern and having different shapes and/or sizes than those in user interfaces 202 and 204. The information for the first piece of content is displayed in tile 0, the information for the second piece of content is displayed in tile 1, the information for the third piece of content is displayed in tile 2, the information for the fourth piece of content is displayed in tile 3, and information for a fifth piece of content is displayed in tile 4. A portion of the user interface at the top and on the right and left sides has no content displayed.

User interface 208 illustrates five tiles labeled as 1, 2, 3, 3, and 4, organized in a different pattern and having different shapes and/or sizes than those in user interfaces 202, 204, and 206. The information for the second piece of content is displayed in tile 1, the information for the third piece of content is displayed in tile 2, the information for the fourth piece of content is displayed in both tiles 3, and the information for the fifth piece of content is displayed in tile 4. The information for the piece of content displayed in both tiles 3 is the same information, although the display will be different for the two tiles because one is rectangular while the other is circular. User interface 208 does not have any tile 0 displaying information for a piece of content, so information for the first piece of content is not displayed in user interface 208. Additionally, there are no portions of user interface 208 that do not have content displayed; rather, tile 2 (which could be referred to as a background tile) includes all of the portions of user interface 208 that are not otherwise covered by a tile 1, 3, or 4.

It is to be appreciated that series 200 and user interfaces 202, 204, 206, and 208 are only examples. The user interface can include any number of tiles organized in any manner, and each tile can have any shape. Additionally, although user interfaces 202, 204, and 206 include portions where no content is displayed, alternatively a user interface may have a background that is a piece of content included in the gallery for which the preview is being displayed in the user interface or alternatively is some other content. This background would be similar to tile 2 in user interface 208, but would not be an individual tile. Furthermore, although FIG. 2 illustrates a series 200 with four user interface layouts, alternatively a series could include fewer than four or greater than four user interface layouts.

As shown by the series 200 of user interfaces, series 200 presents different user interfaces to the user that allow the user to preview the pieces of content that are available from a gallery. Depending on the implementation and how many pieces of content are include in the gallery, the user interfaces in series 200 may not display information for all of the pieces of content that are included in the gallery. Rather, the user interfaces in series 200 would display a preview of the content of the gallery, which would be information for at least some of the pieces of content that are included in the gallery. Additionally, by transitioning to different user interfaces 202, 204, 206, and 208 in series 200, the preview of the gallery presented to the user is dynamic—the preview changes, with the displays of the information for pieces of content moving to different locations on the screen, shapes and sizes changing, and even the particular information being displayed changing.

Figure 4:
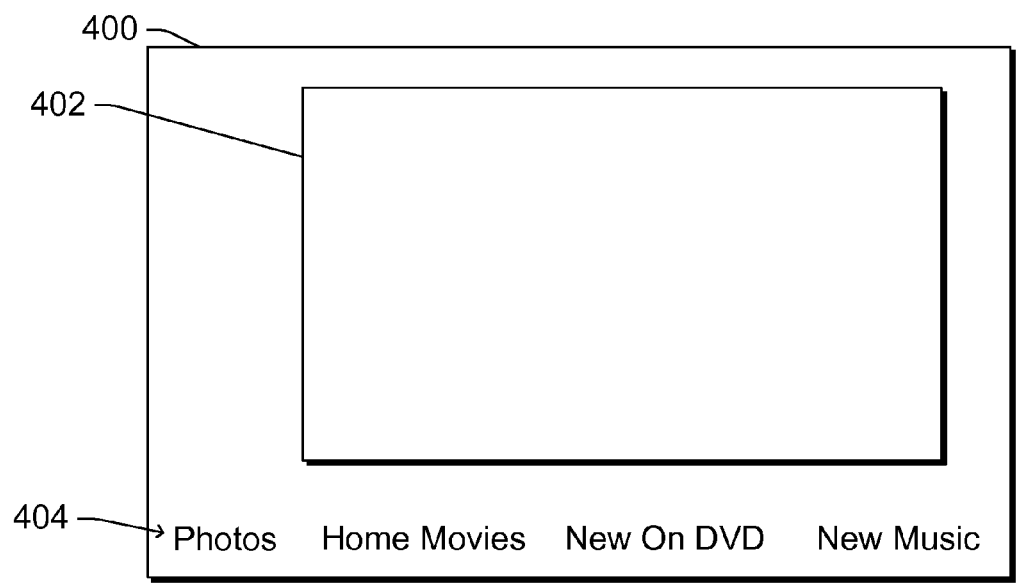
FIG. 4 illustrates an example user interface for previewing live content.

FIG. 4 illustrates an example user interface for previewing live content. User interface 400 includes a window 402 and gallery options 404. Different user interfaces for previewing live content are displayed in window 402. For example, series 200 of user interfaces 202, 204, 206, and 208 can be displayed in window 402. Gallery options 404 display identifiers of different galleries (e.g., galleries 106 of FIG. 1 or FIG. 3) that are available to the user. In the example of FIG. 4, a "photos" gallery, a "home movies" gallery, a "new on DVD" gallery and a "new music" gallery is available to the user.

The user can select one of gallery options 404 in a variety of different manners. For example, the user could maneuver a cursor over one of the identifiers in options 404 and select that identifier by pressing a button on a cursor control device. By way of another example, the user could hover a cursor over one of the identifiers (e.g., position the cursor over the identifier for at least a threshold amount of time, such as 1-3 seconds). Once selected, a user interface for previewing live content from the selected gallery is displayed in window 402. This user interface can be a series of user interfaces, such as discussed above with respect to FIG. 2. Live content from different galleries can be previewed by selecting different identifiers from options 404.

In one or more embodiments, the user can select a tile being displayed in the user interface in window 402 (or alternatively can select anywhere in window 402) to cause the gallery being previewed in window 402 to be selected for display. The selection can be made in a variety of different manners, such as by the user maneuvering a cursor over a portion of window 402 and pressing a button on a cursor control device. In response to the selection, user interface module 102 of FIG. 1 (or alternatively another component) presents the user interface for the selected gallery in window 402 rather than the preview of the gallery. Alternatively, the user interface for the selected gallery may be presented in a different window. The user interface presented for the gallery can be any interface desired by the designer or administrator of the gallery.

Figure 5:
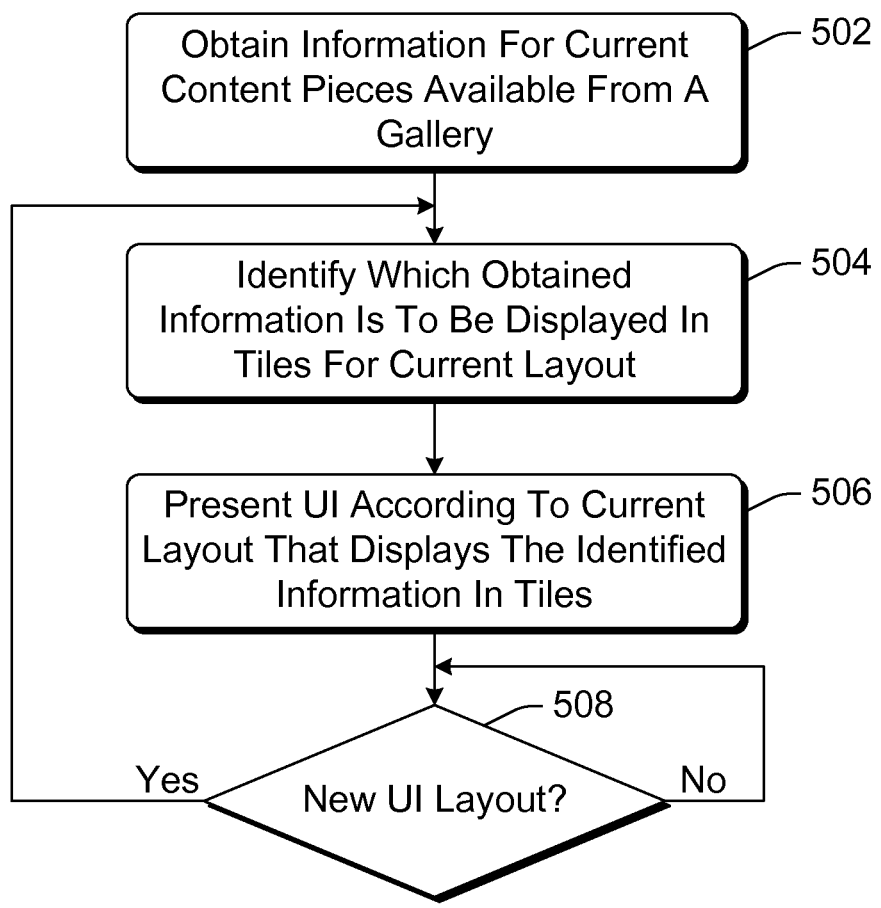
FIG. 5 is a flowchart illustrating an example process for displaying a user interface for previewing live content for a gallery.

FIG. 5 is a flowchart illustrating an example process 500 for displaying a user interface for previewing live content for a gallery. Process 500 can be performed by user interface module 102 of FIG. 1 or FIG. 3, and can be implemented in software, firmware, hardware, or combinations thereof.

Initially, pieces of information for the content pieces currently available from a gallery are obtained (act 502). As discussed above, these pieces of information can be obtained from different sources, such as directly from the gallery itself, from another content source, from a local cache, and so forth. This information obtained in act 502 can be the pieces of content themselves, or alternatively different information such as a preview image, text, audio, and so forth. Such different information can be in addition to, or in place of, the pieces of content. Additionally, as discussed above, pieces of information can be obtained for all the current content pieces available from the gallery, or alternatively only some of the content pieces.

Which of these obtained pieces of information are to be displayed in tiles for the current layout of the user interface are also identified (act 504). As discussed above, information for all of the pieces of content may not be displayed in the user interface. Accordingly, only those that are to be displayed in the current layout for the user interface are identified in act 504.

A user interface according to the current layout that presents the identified information for content pieces in tiles of the user interface is presented (act 506). Typically this presentation is displaying the information, although the content pieces could alternatively be presented in other manners (e.g., audibly). As discussed above, the information displayed in the tiles is a preview of the pieces of content available from the gallery, and can be an actual piece of content, a portion of a piece of content, or other information. A check is then made as to whether there is a new user interface layout (act 508). The user interface with the current layout is displayed until a new layout is to be displayed or another indication that the user interface is not to be displayed is received (e.g., the user interface is closed, the user interface is covered by another window, etc.). When there is a new user interface layout, process 500 returns to act 504 to identify which information is to be displayed in tiles for the new layout of the user interface.

A new user interface layout can be signaled in different manners. In one or more embodiments, the user interface transitions to a new layout at regular or irregular intervals. A timer or other signal is used to indicate when such an interval has passed, indicating that the duration of time for displaying the user interface from the current layout has passed and it is time for a new layout to be used. The particular interval(s) to use can be indicated in different manners, such as being programmed into user interface module 102, being identified in one or more of the layouts, being obtained from a gallery or other content source, and so forth.

Although the new user interface layout can be signaled in different manners, it should be noted that the signaling, and thus the transitioning to a new user interface, is done automatically. No input is required from a user in order for the transition to occur. The transition occurs automatically without the user selecting a tile, without the user selecting any other displayed icon or option, and without the user inputting a transition request or transition command in any other way.

Figure 6:
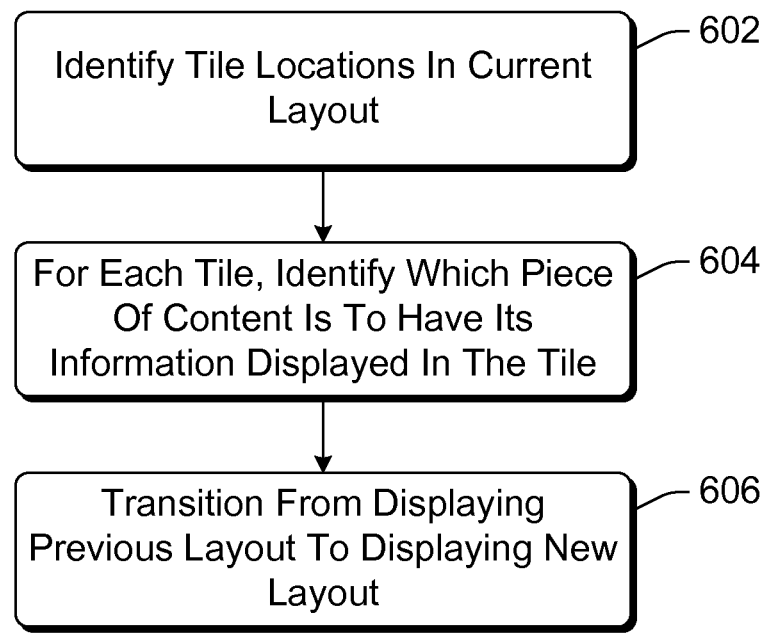
FIG. 6 is a flowchart illustrating an example process for generating a user interface for display for previewing live content for a gallery.

FIG. 6 is a flowchart illustrating an example process 600 for generating a user interface for display for previewing live content for a gallery. Process 600 can be performed by user interface module 102 of FIG. 1 or FIG. 3, and can be implemented in software, firmware, hardware, or combinations thereof. Process 600 can be, for example, act 506 of FIG. 5.

Initially, the tile locations in the current layout are identified (act 602). As discussed above, tiles can be positioned in different locations in different layouts. For each tile, which piece of content is to its information displayed in the tile is identified (act 604). In one or more embodiments, each piece of content is associated with a different tile identifier (which could be, for example, the tile labels illustrated in FIG. 2). The tile identifier for each tile is maintained by the layout. The piece of content that is to have its information displayed in the tile can be identified by identifying the tile identifier for the tile, and then using the tile identifier to identify the associated piece of content.

Pieces of content can be associated with tiles in different manners. In one or more embodiments, each piece of content is associated with a particular tile identifier as the piece of content is obtained from the gallery by user interface module 102 of FIG. 1. When a piece of content is obtained (or information for the piece of content), it is assigned an identifier using the same scheme as was used to assign identifiers to the tiles (e.g., the first piece of content can be assigned an identifier of 0, the second piece of content can be assigned an identifier of 1, and so forth). Alternatively, each piece of content can be associated with a tile identifier by some other component and the identifier can be obtained by user interface module 102 as the piece of content is obtained (or alternatively at some other time). This other component could be a device implementing the gallery that includes pieces of the component, or alternatively some other component or device.

The display then transitions from displaying the previous layout (if any) to the new layout (act 606). The tiles in the new layout display the pieces of content identified in act 604.

In one or more embodiments, pieces of content are associated with tiles in a random manner. For example, as discussed above, the pieces of content can be associated with particular tiles as the pieces of content are obtained from the gallery.

Alternatively, pieces of content can be associated with particular tiles following a particular set of rules. For example, tile identifiers can be numbers and layouts could be designed so that one or more tiles with lower-valued numbers are displayed more prominently than other tiles (e.g., tile 0 is displayed more prominently than any other tile, tile 1 is displayed more prominently than any other tile except tile 0, and so forth). In the layouts, tiles with lower-valued number identifiers could be located more centrally on the user interface, such tiles could be larger, in a series of tiles the tiles with those identifiers may not change locations, and so forth.

Given such a set of rules, lower-valued numbers could be assigned as identifiers to the pieces of content that are to be displayed more prominently. For example, the piece of content to be displayed most prominently could be given an identifier of 0, so that it is displayed in tile 0. The identifiers could be assigned to the pieces of content by various entities, such as the gallery that includes the piece of content, user interface module 102, or some other component or device.

Numerous usage scenarios can optionally be created using this ability to display certain pieces of content more prominently. For example, an advertising fee could be charged for these lower-valued numbers, allowing the manufacturer or distributor (or user or other party) of user interface module 102 to collect this fee each time one of the pieces of content associated with these lower-valued number tiles is displayed, or to collect a fee in exchange for being able to use layouts that display such pieces of content more prominently. This would allow, for example, a preview of a gallery of movies to display information for a particular movie (such as a new film that a studio is promoting heavily) more prominently than other movies, or allow a preview of a gallery of music albums to display an image of a particular music album (e.g., a new release) more prominently than the images of the other music albums.

By way of another example, these lower-valued numbers could be assigned based on other priorities or rankings for the pieces of content, allowing information for pieces of content that are a higher priority or having a higher ranking to be displayed more prominently. For example, the current top ten movies or albums could be given prominence, user-supplied rankings could be used to determine rank or priority, pieces of content could be assigned a rank or priority based on how frequently it is accessed by users and/or when it was last accessed by a user, and so forth.

Additionally, other data could be obtained from other galleries or content sources to be displayed in one or more of the tiles. This other data could be, for example, advertising data. Thus, when a user interface previewing a gallery is presented to the user, the user is also presented with this other data. This other data could be displayed more prominently than the pieces of content from the gallery, or alternatively less prominently (or as prominently). Different usage scenarios could include a fee being charged to the providers of this advertising data, which could be paid to the user, the manufacturer or distributor of user interface module 102, the host of the gallery, and so forth.

Figure 7:
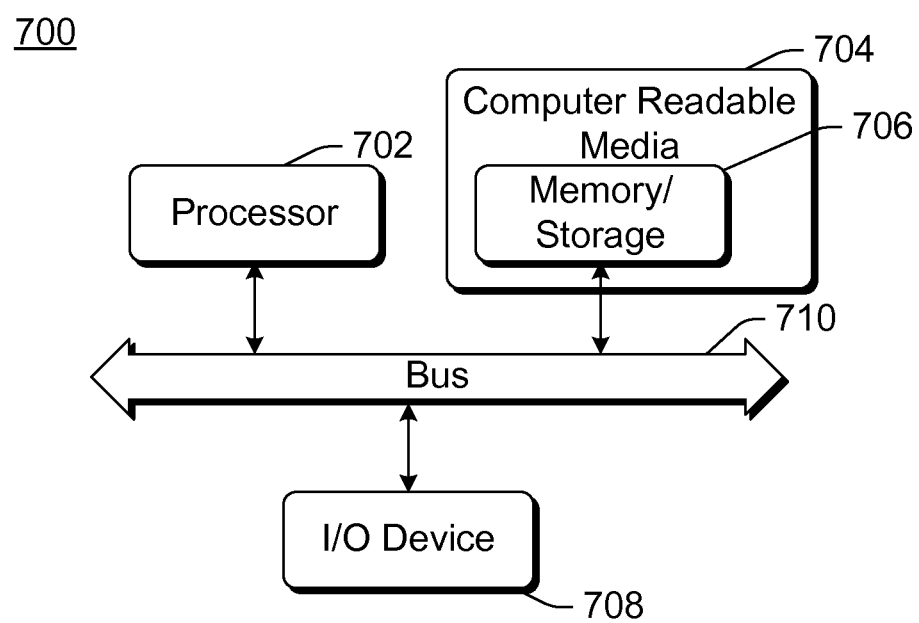
FIG. 7 illustrates an example computing device that can be configured to implement the dynamic user interface for previewing live content in accordance with one or more embodiments.

FIG. 7 illustrates an example computing device 700 that can be configured to implement the dynamic user interface for previewing live content in accordance with one or more embodiments. Computing device 700 can implement, for example, user interface module 102 or a gallery 106 of FIG. 1 or FIG. 3, or a local cache 302 or content source 304 of FIG. 3.

Computing device 700 includes one or more processors or processing units 702, one or more computer readable media 704 which can include one or more memory and/or storage components 706, one or more input/output (I/O) devices 708, and one or more busses 710 that allows the various components and devices to communicate with one another. Computer readable media 704 and/or I/O device(s) 708 can be included as part of, or alternatively may be coupled to, computing device 700. Bus 710 represents one or more of any of several types of bus structures, including a memory bus or memory controller, a peripheral bus, an accelerated graphics port, and a processor or local bus using any of a variety of bus architectures. Bus 710 can include wired and/or wireless buses.

Memory/storage component 706 represents one or more computer storage media. Component 706 can include volatile media (such as random access memory (RAM)) and/or nonvolatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
displaying a series of user interface layouts that each have multiple tiles displaying multiple pieces of information associated with one or more pieces of content, the multiple pieces of information comprising different types of information and each of the multiple tiles displaying a piece of the information; and
transitioning to display a next user interface layout in the series automatically after a current user interface layout has been displayed for a predetermined amount of time.

2. A computer-implemented method as recited in claim 1, wherein the different types of information include at least two of an image, a text description, audio content, or video content.

3. A computer-implemented method as recited in claim 1, wherein at least one of the different types of information comprises an image extracted from the one or more pieces of content.

4. A computer-implemented method as recited in claim 1, wherein the multiple tiles are each configured to display two or more of the different types of information concurrently.

5. A computer-implemented method as recited in claim 1, wherein at least one of the multiple pieces of information displayed by one of the multiple tiles changes over time.

6. A computer-implemented method as recited in claim 5, wherein the at least one of the multiple pieces of information that changes over time comprises at least one of animation content, a slideshow of images, or video content.

7. A computer-implemented method as recited in claim 1, wherein one of the multiple tiles displays a first type of the different types of information in the current user interface layout, and responsive to the current user interface layout transitioning to display the next user interface layout, displays a second type of the different types of information.

8. A computer-implemented method as recited in claim 1, wherein the next user interface layout has one of the multiple tiles displaying an additional piece of information that is not displayed by the current user interface layout, the additional piece of information comprising an additional different type of information.

9. A computer-implemented method as recited in claim 1, further comprising obtaining the one or more pieces of content from a gallery, and wherein at least one of the multiple pieces of information is associated with respective content as metadata.

10. A computer-implemented method as recited in claim 1, wherein different user interface layouts include different quantities of tiles.

11. One or more computer storage media having stored thereon instructions that, when executed by one or more processors of a computing device, cause the one or more processors to:
obtain multiple pieces of information that comprise different types of information associated with content that is available from a gallery;

display a series of user interface layouts that each have multiple tiles displaying the multiple pieces of information and present the multiple tiles organized differently than other user interface layouts in the series, each of the multiple tiles displaying a piece of the information; and transition to display a next user interface layout in the series automatically after a current user interface layout has been displayed for a predetermined amount of time.

12. One or more computer storage media as recited in claim 11, wherein the different types of information include at least two of an image, a text description, audio content, or video content.

13. One or more computer storage media as recited in claim 11, wherein the multiple tiles are each configured to display at least two of the different types of information concurrently.

14. One or more computer storage media as recited in claim 11, wherein at least one of the multiple pieces of information displayed by one of the multiple tiles changes over time.

15. One or more computer storage media as recited in claim 11, wherein the multiple pieces of information are associated with the content by at least one of being stored with respective content as metadata or stored on a same content source as the respective content.

16. One or more computer storage media as recited in claim 11, wherein the instructions further cause the one or more processors to obtain additional pieces of information associated with the content from one or more additional galleries.

17. One or more computer storage media as recited in claim 16, wherein the additional pieces of information comprise at least one additional type of information that is not one of the different types of information.

18. One or more computer storage media as recited in claim 11, wherein the instructions further cause the one or more processors to access the gallery for updates to the multiple pieces of information.

19. A computer-implemented method comprising:
displaying a user interface; and
automatically transitioning over time through a series of user interface layouts of the user interface, each user interface layout in the series presenting multiple tiles organized differently than the other user interface layouts in the series, the automatic transition from a current user interface layout in the series to a next user interface layout in the series occurring after the current user interface layout is displayed for a predetermined amount of time.

20. A computer-implemented method as recited in claim 19, wherein the multiple tiles display multiple pieces of information comprising different types of information, and wherein each of the multiple tiles displays a piece of the information.

* * * * *